United States Patent [19]

St-Gelais

[11] Patent Number: 5,775,206
[45] Date of Patent: Jul. 7, 1998

[54] COFFEEMAKER WITH A PERMANENT FILTER

[76] Inventor: Yvan St-Gelais, Erl Etude et Recherche, 4480 Côte-de-Liesse, bureau 224, Ville Mont-Royal, Quebec, Canada, H4N 2R1

[21] Appl. No.: 712,060

[22] Filed: Sep. 10, 1996

[51] Int. Cl.[6] ............................................. A47J 37/10
[52] U.S. Cl. .................... 99/323; 99/317; 99/295; 99/306
[58] Field of Search ................. 99/306, 304, 323, 99/295, 279, 317

[56] References Cited

U.S. PATENT DOCUMENTS

| 3,985,069 | 10/1976 | Cavalluzzi | 99/306 |
| 4,174,659 | 11/1979 | Pugliese et al. | 99/306 |
| 4,446,158 | 5/1984 | English et al. | 426/79 |

FOREIGN PATENT DOCUMENTS

| 792805 | 10/1935 | France . |
| 914538 | 6/1946 | France . |

*Primary Examiner*—Reginald L. Alexander

[57] ABSTRACT

The present invention relates to a new coffeemaker with a permanent filter that is composed of a tank, whose bottom is perforated small holes, this tank is attached to an infusion chamber provided with a support, the set resting on a container or a mug. The rate of the boiling water flow is controlled by the small holes of the tank bottom. A chimney located within the tank allows the infusion gases to escape from the infusion chamber. The flow of the infused water is done through a permanent filter at the bottom of the infusion chamber The support is a flange that has a plurality of holes allowing the vapor to escape from the mug and, also giving the possibility for the user to see the level of the infused water in the same mug.

15 Claims, 2 Drawing Sheets

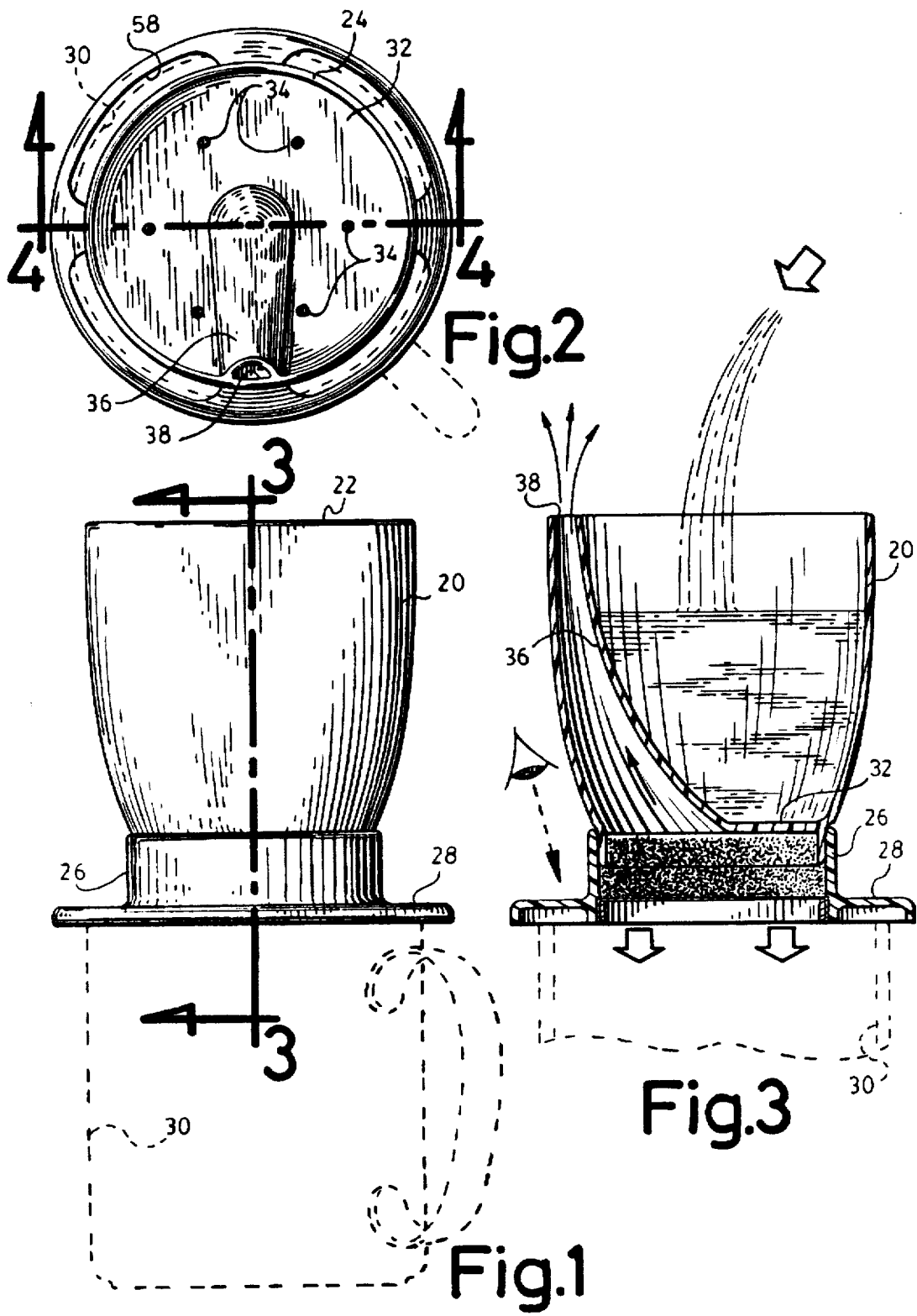

COFFEEMAKER WITH A PERMANENT FILTER

FIELD OF THE INVENTION

This invention belongs to the field of the devices used for the production of coffee, particularly the infusion of coffee.

PRIOR ART

A review of the prior art revealed some patents concerning the following principles: two superimposed components, a container for boiling water and a container for ground coffee.

The following patents were considered as relevant. FR 792,805, Negre, Oct. 28, 1935, describes a device that regulates and makes the coffee penetration easier through the domestic filters or others. The distinctive feature of this invention is to introduce in the infusion chamber a vertical partition of any shape and material that prevents the locking and distribute the coffee powder in numerous cavities.

FR 914,538, Bastien, Jun. 17, 1946, shows a coffeemaker provided with a cylinder for water whose bottom is pierced with a very small hole, calibrated for the water drip flow, and for a coffee powder cylinder whose bottom is pierced with big holes, covered with a paper-filter disc. Bastien's invention is not economical because the filter is a single use paper filter.

U.S. Pat. No. 3,985,069, Cavalluzzi, Oct. 12, 1976, describes a drip flow percolator formed by a cone-shaped body fit to be placed on an empty mug. The bottom of the body includes an infusion chamber covered by a snapped perforated disc and containing roasted, ground and non-compact coffee taking up a volume smaller than the total volume of the chamber. The control of the infused water flow in the chamber, the coffee dampness and distribution and the infusion flow outside the chamber are the result of an optimal extraction rate and a predetermined volume of coffee freshly infused that is collected in the mug.

U.S. Pat. No. 4,174,659, Pugliese et al., Nov. 20, 1979, illustrates a coffee percolator for one cup provided with two superimposed components whose first component is a tank for boiling water with a cup shape that has an opening wider than the bottom that is pierced with holes and, second component is a cylinder-shaped board having a central cavity receiving the ground coffee with a bottom surface perforated with cross slits for the flow of infused water.

U.S. Pat. No. 4,446,158, English et al., May 1, 1984, shows an individual and disposable coffee container with a filter including a flat structure having a central opening, layers of filter covering and fixed to the structure top and bottom and multiple coffee compartments formed within the container and distributed into a web like arrangement. Furthermore, an infusion cavity with a base having a central opening is also provided.

By looking back at all those prior art inventions, some drawbacks are appearent, such as: the creation of gas during the infusion that cannot escape. Also, to check the level of coffee in the mug, the user has to raise the coffeemaker with high chances to be burned by the vapor contained in the mug. Furthermore, there could be accumulation of pressure inside the mug by the formation of a seal between the coffeemaker and the mug, that could have the effect to slow down the coffee making of the infused water flow.

OBJECTIVE OF THE INVENTION

The objective of this invention is to make coffee by putting away the drawbacks mentioned about in the previous section entitled "prior art".

SUMMARY OF THE INVENTION

The present invention relates to a coffeemaker with a permanent filter comprising, superimposed, a set of two components and a fastening means of which:

a tank for receiving boiling water having side walls, a bottom surface, and an opened top defined by an upper edge, the bottom surface being perforated with a plurality of small holes allowing the flow of the boiling water, the side walls being extended downwardly;

an infusion chamber used to receive ground coffee and having side walls, a bottom surface, and a supporting means, the bottom surface being partially a permanent filter allowing the flow of the boiling water infused with the ground coffee, the supporting means providing support to rest the coffeemaker above a container;

a fastening means connecting the extended side walls of the tank to the side walls of the infusion chamber, the tank sitting above the infusion chamber, the fastening means providing a sealed interface, so as to prevent any leak of the water;

a chimney located vertically within the tank, the chimney being opened at both ends and connecting the infusion chamber to the opened top of the tank, the upper end of the chimney is at the same level as or above the upper edge of the tank, the chimney allowing infusion gases to escape from the infusion chamber.

Also, the invention provides a coffeemaker of which the supporting means of the infusion chamber is a flange that can have a plurality of openings forming windows allowing a user to see the water infused with the ground coffee into the container, the openings enabling the vapor to escape from the container by preventing any possibility of pressure built-up into the container.

SUMMARY OF DRAWINGS

We will describe in detail thereafter, for indicative purpose and by no means as of limitation, a preferred embodiment in accordance with this invention with reference to the associated drawings in which:

FIG. 1 is a front view of a coffeemaker with a permanent filter;

FIG. 2 is a plan view of a coffeemaker with a permanent filter;

FIG. 3 is a sectional view according to line 3—3 of FIG. 1;

DETAILED DESCRIPTION OF THE PREFERRED EMBODIMENT

Figure 4:
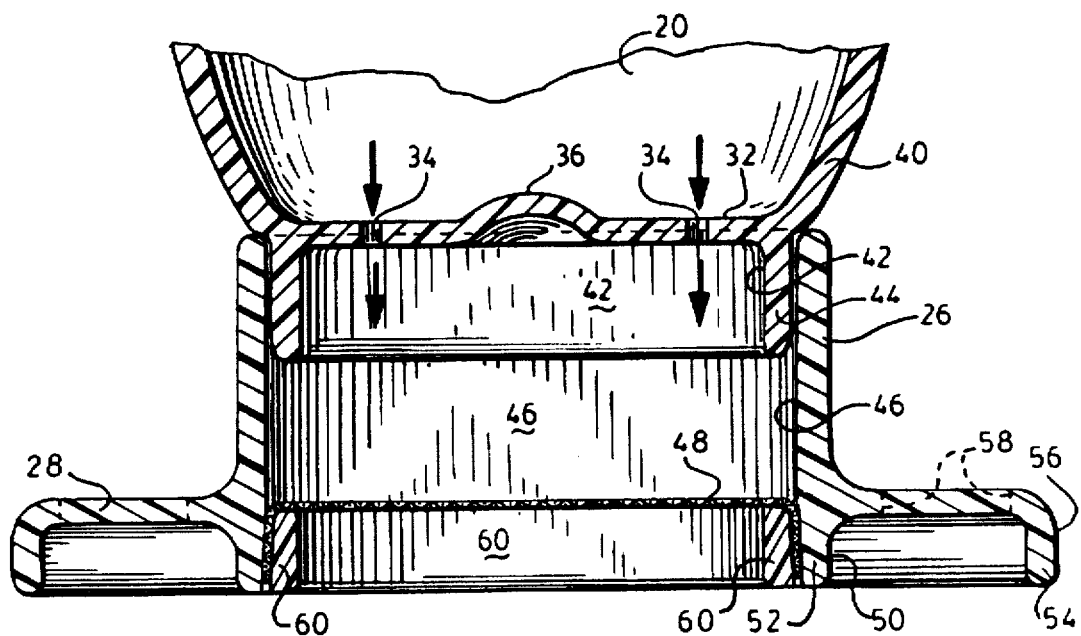
FIG. 4 is an enlarged sectional view according to line 4—4 of FIG. 2.

The detailed description of the present invention of a coffeemaker with a permanent filter is illustrated in FIG. 1 where the same characterizing components are identified by the same numbers and where we see:

A tank 20 for receiving boiling water, preferably made out of polypropylene plastic, able to withstand the water temperature and having side walls, preferably an inverted cone-shaped walls, a bottom surface 32, and an opened top 22 defined by an upper edge 24.

An infusion chamber 26 having side walls, preferably in the shape of a cylinder and made out of polypropylene plastic, and a bottom surface is used as a ground coffee receptacle. The infusion chamber 26 also comprises a supporting means 28 that allows this chamber 26 to rest on a container 30, preferably a cup.

In the FIG. 2, it is shown that the bottom surface 32 of the tank 20 is perforated with a plurality of small holes 34, preferably circular, allowing the flow of the boiling water, at a preferred rate of about half a cup per minute.

The tank 20 comprises a vertical chimney 36, located preferably adjacently along the side wall of the tank 20 (FIGS. 2 and 3) so as to minimize the possibility for a user to pour boiling water into the chimney 36. The chimney 36 connects the infusion chamber 26 to the opened top 22 of the tank 20 (FIG. 3). Furthermore, the chimney 36 serves as an evacuation means for the gases formed during the coffee infusion. The cross-section of its opening 38 is large enough to allow the gases to escape from the infusion chamber 26.

FIG. 4 shows an enlargement of the fastening means connecting the tank 20 to the infusion chamber 26. Preferably, the tank 20 is formed with side walls 40 having a small slope down to a bottom 42, set back and extended straight and starting at the height of the bottom surface 32. The outside perimeter 44 of the bottom surface 42, preferably of a cylindrical shape, is at the very most equal to the inner perimeter 46, also of cylindrical shape, of the infusion chamber 26 allowing a tight fit joint between the tank 20 and the infusion chamber 26 thus forming the fastening means. This fastening means allows a sealed interface so as to prevent the leak of water between the tank 20 and the infusion chamber 26 and, confines the ground coffee in between the bottom surface 32 of the tank 20, the side walls and the filter 48 of the infusion chamber 26.

The supporting means 28 of the infusion chamber 26, and the whole coffeemaker is preferably a flange comprising a first rim 50 downwardly oriented and located on its inner perimeter 52 and a second rim 54 also downwardly oriented and located on its outer perimeter 56. These first and second rims 50, 54 prevent the coffeemaker from sliding onto the container 30 and falling down.

Figure 5:
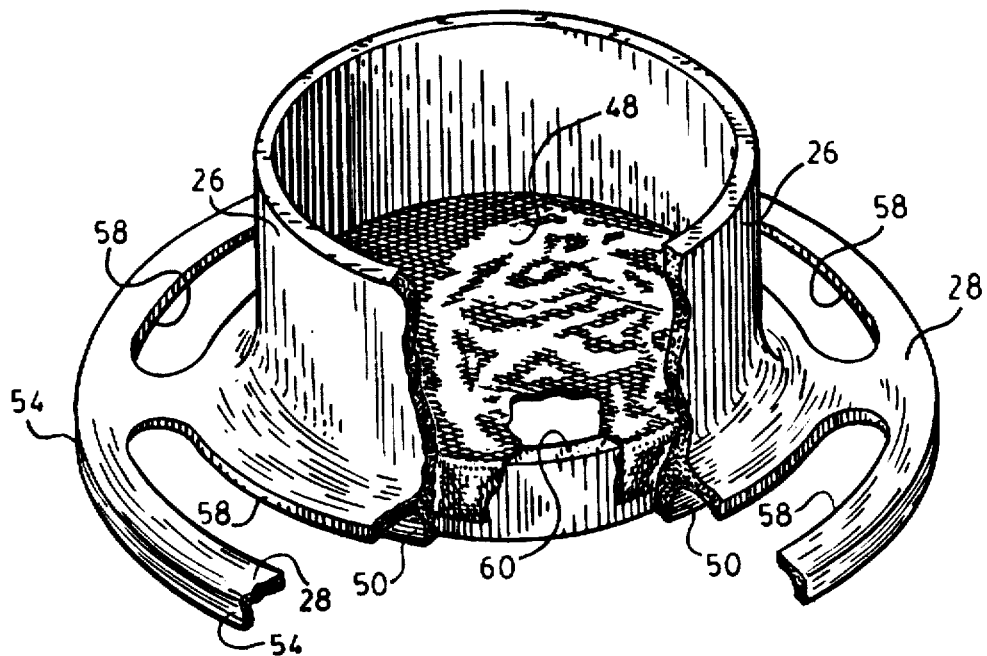
FIG. 5 is a partially broken front perspective view of the infusion chamber of a coffeemaker with a permanent filter.

FIG. 5 shows that the flange 28 of the supporting means allows the infusion chamber 26 to rest onto the container 30, and comprises a plurality of openings 58 forming windows allowing a user to see the water infused with the ground coffee into the container 30, thus preventing any overflow of the infused boiling water which might cause injury to the user. The openings 58 are also intended for the vapor to escape from the container 30, thus allowing a good flow of the infused water through the filter 48 by eliminating any possibility of pressure built-up inside the container 30 caused by the formation of a seal between the coffeemaker and the container 30, and also, any possible vapor burns to the user when removing the coffeemaker from the container 30. The filter 48, preferably made out of stainless steel, and covering ideally the entire surface area of the base of the infusion chamber 26, contains preferably between 15,000 and 30,000 openings by square inch of surface area, thus allowing a good flow of the infused water in the container 30. The filter 48 is clipped in permanently between the infusion chamber 26 and a fitting ring 60.

With the present invention, it is possible, among other things, to make a single cup of coffee, from ground coffee beans, almost as quickly as instant coffee while favoring the formation of good taste. We have to emphasize that, instead of polypropylene plastic the coffeemaker can be made out of other materials such as stainless steel or the like and, that it can be used, besides coffee, with tea and herb tea leaves.

Also, the size of the flange offers the advantage to fit a wide variety of existing containers 30 or mugs. Finally, the chimney 36 of the tank 20 could, in another embodiment, be located in the center of the tank 20.

Although only a single embodiment of the present invention has been described and illustrated, the present invention is not limited to the features of this embodiment, but includes all variations and modifications within the scope of the claims.

I claim:

1. A coffeemaker with a permanent filter comprising:

a tank for receiving boiling water having side walls, a bottom surface attached to said side walls, and an opened top defined by an upper edge, said bottom surface being perforated with a plurality of small holes allowing the flow of said boiling water, said side walls being extended downwardly;

an infusion chamber used to receive ground coffee and having side walls, a bottom surface, and a supporting means, said bottom surface being partially a permanent filter allowing the flow of said boiling water infused with said ground coffee, said supporting means providing support to rest said coffeemaker above a container;

a fastening means connecting said extended side walls of said tank to said side walls of said infusion chamber, said tank sitting above said infusion chamber, said fastening means providing a sealed interface, so as to prevent any leak of said water;

a chimney vertically located within said tank along said tank side walls, said chimney being opened at both ends with a lower end being attached to said tank bottom and connecting said infusion chamber to said opened top of said tank, said upper end of said chimney is at the same level as or above said upper edge of said tank, said chimney allowing infusion gases to escape from said infusion chamber.

2. A coffeemaker of claim 1, wherein said fastening means is a tight fit joint formed by the insertion of said extended side walls of said tank into said side walls of said infusion chamber, the outside perimeter of said extended side walls of said tank being substantially equal to the inner perimeter of said side walls of said infusion chamber.

3. A coffeemaker of claim 1, wherein said supporting means being a flange, and said side walls of said tank and said infusion chamber being of generally cylindrical shape, said flange resting on said container.

4. A coffeemaker of claim 3, wherein said chimney runs adjacently along said side wall of said tank.

5. A coffeemaker of claim 2, wherein said tank and said infusion chamber are made of polypropylene plastic resistant to said boiling water temperature and, said filter is made out of stainless steel.

6. A coffeemaker of claim 2, wherein said filter covers the entire surface area of said bottom surface of said infusion chamber.

7. A coffeemaker of claim 2, wherein said filter is made out of stainless steel and contains between 15,000 and 30,000 openings by square inch of surface area.

8. A coffeemaker of claim 2, wherein said tank contains a volume of said boiling water corresponding to a cup.

9. A coffeemaker of claim 4, wherein said tank and said infusion chamber are made of polypropylene plastic resistant to said boiling water temperature and, said filter is made out of stainless steel.

10. A coffeemaker of claim 4, wherein said filter covers the entire surface area of said bottom surface of said infusion chamber.

11. A coffeemaker of claim 4, wherein said filter is made out of stainless steel and contains between 15,000 and 30,000 openings by square inch of surface area.

12. A coffeemaker of claim 4, wherein said tank contains a volume of said boiling water corresponding to a cup.

13. A coffeemaker of claim 4, wherein said flange having a first rim downwardly oriented and located on its inner perimeter and a second rim also downwardly oriented and located on its outer perimeter, said first and second rims serving as stoppers for preventing said coffeemaker to slide onto said container and fall down.

14. A coffeemaker of claim 3, wherein said flange of said supporting means comprises a plurality of openings forming windows allowing a user to see said water infused with said ground coffee into said container, said openings enabling the vapor to escape from said container by preventing any possibility of pressure built-up into said container.

15. A coffeemaker of claim 13, wherein said flange of said supporting means comprises a plurality of openings forming windows allowing a user to see said water infused with said ground coffee into said container, said openings enabling the vapor to escape from said container by preventing any possibility of pressure built-up into said container.

* * * * *